No. 671,316. Patented Apr. 2, 1901.
T. A. EDISON.
APPARATUS FOR SCREENING OR RESCREENING FINE MATERIALS.
(Application filed Mar. 7, 1900.)
(No Model.) 2 Sheets—Sheet 1.
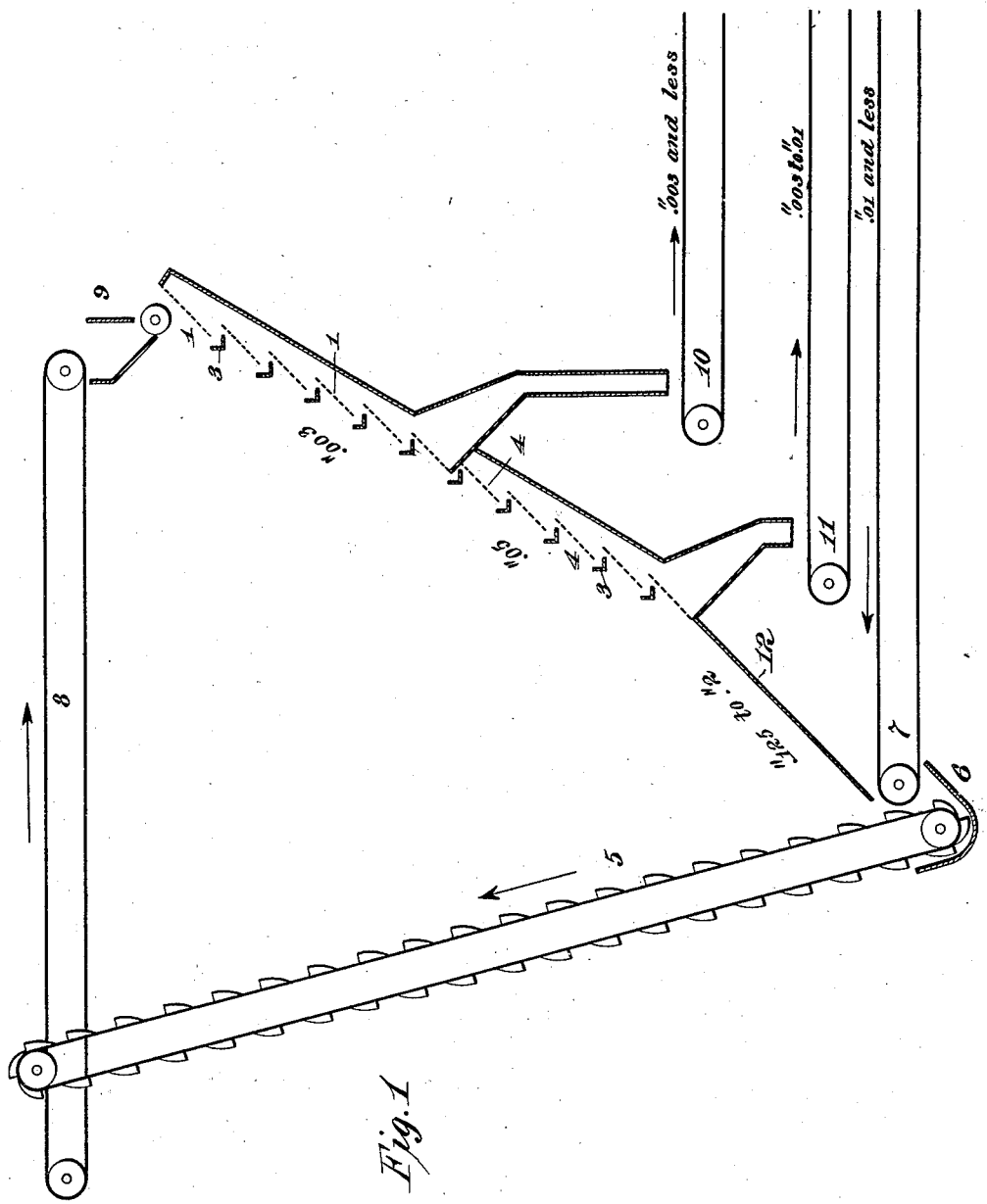
Witnesses:
Inventor
Thomas A. Edison
by Dyer Edmonds & Dyer
Att'ys.

No. 671,316. Patented Apr. 2, 1901.
T. A. EDISON.
APPARATUS FOR SCREENING OR RESCREENING FINE MATERIALS.
(Application filed Mar. 7, 1900.)
(No Model.) 2 Sheets—Sheet 2.
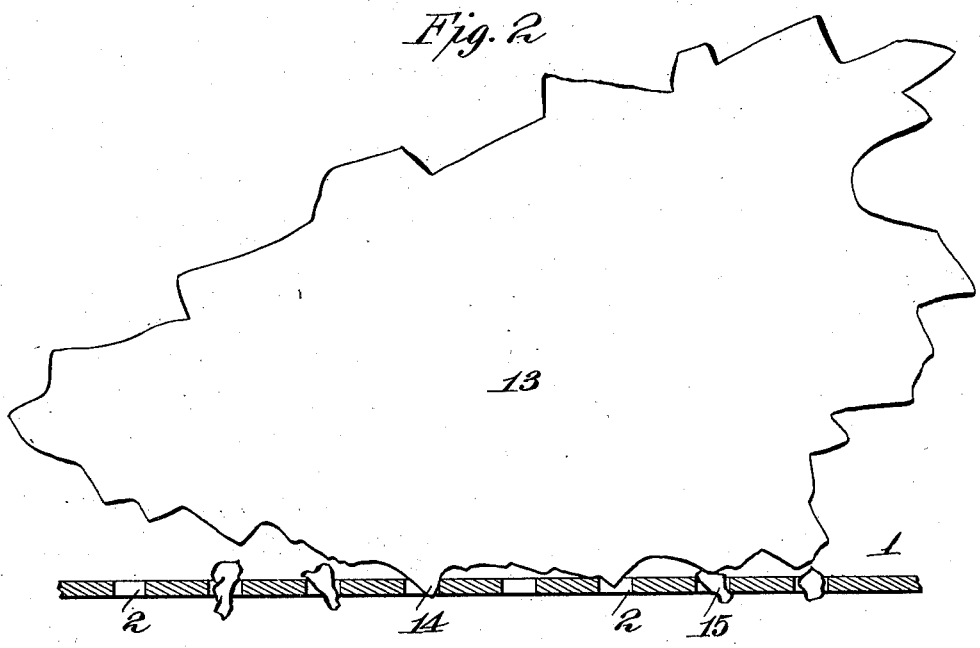
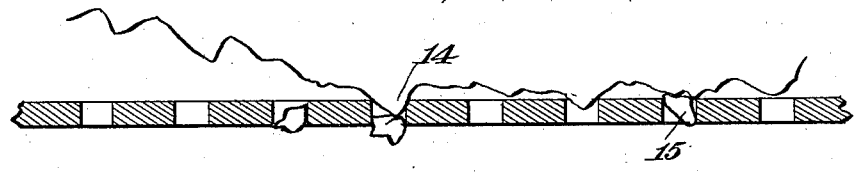
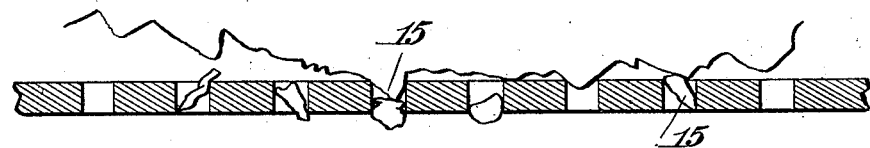
Witnesses: Inventor
Thomas A. Edison
by Dyer Edmonds & Dyer
Att'ys.

UNITED STATES PATENT OFFICE.

THOMAS A. EDISON, OF LLEWELLYN PARK, NEW JERSEY.

APPARATUS FOR SCREENING OR RESCREENING FINE MATERIALS.

SPECIFICATION forming part of Letters Patent No. 671,316, dated April 2, 1901.

Application filed March 7, 1900. Serial No. 7,623. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Apparatus for Screening or Rescreening Fine Materials, (Case No. 1,028,) of which the following is a description.

My present invention relates to apparatus designed particularly for rescreening fine materials after they have been subjected to a screening apparatus of coarser mesh than that which is ultimately desired; but my improved apparatus may be employed for the purpose of screening crushed or otherwise reduced material in the first instance.

The principal difficulty encountered in practice in screening very fine materials has been due to the clogging or choking of the interstices of the screen-plates and also the fact that the fine materials tend to clot or aggregate together, so that the individual particles are not properly presented to the screen-surface. By adding to the fine particles which are to be screened or rescreened a larger bulk of much coarser particles, either of the same or of different material, the screening operation will be very materially facilitated, because the presence of the coarser particles prevents the finer particles from clotting or aggregating, and thereby allows the individual particles to be effectively acted upon by the screening-plates, and also for the more important reason that the numerous fine points or projections of the coarser particles actually engage within the slots or other screen-openings to remove therefrom any of the smaller particles which may have become wedged or crowded into such openings to otherwise choke them.

My present invention provides an apparatus for carrying out this method of screening, and it comprises in its generic aspect a screen or screens of the fine ultimate mesh desired through which the sufficiently fine particles will pass; secondly, an additional screen or screens of coarser mesh through which may pass, preferably, all of the fine particles rejected by the first screen or screens, and, thirdly, proper means for flowing over the fine screen or screens with the fine particles a larger but approximately constant bulk of very much coarser particles which cannot pass through either of the screens, the bulk of coarser particles being maintained in circuit between the bottom of the coarse screen or screens and the top of the fine screen or screens. My improved apparatus when thus employed for effecting a screening operation will therefore maintain in constant movement over the several screens an approximately uniform load of sufficiently coarse material as not to be affected by any of the screens, so that by introducing into the load of coarse material the desired proportion of fine material the sufficiently fine particles of the latter will be first removed by their passage through the fine screens, while the rest of the fine particles will pass through the coarser screens and can, if desired, be returned for further reduction in size. This passage of an approximately constant load of coarse particles through two screening devices of different mesh serves to keep the screen-openings always clean, as explained, and prevents the finer particles from clotting or aggregating together. The cleaning effect which is thus secured is obviously better when the screens are very thin, because there will be presented many points or projections on the coarser particles which can enter the screen-openings and project therethrough to the entire depth thereof. In fact, it appears that the cleaning effect of the coarser particles becomes very greatly reduced as the thickness of the screen-plates or other surfaces is increased. In order to secure the best results, therefore, I make the screen-plates as thin as practicable and preferably less than the width of the screening-openings. Thus if the screening-openings are in the form of slots .009 of an inch in width the screen-plates may be conveniently made .006 of an inch in thickness.

My invention is particularly designed, as stated, for the rescreening of material which has already been subjected to the effect of a screening apparatus of greater mesh than that which is ultimately desired. When it is necessary, as in the manufacture of high-grade Portland cement, for instance, to obtain a uniform run of extremely fine material—say with particles .003 of an inch in diameter or less—it is preferable to carry on the screening or grading of the material by at least two screening operations of different mesh. Thus if it is desired to secure extremely fine particles of, say, .003 of an inch or under in diameter it is preferable to first subject the crushed material in bulk to a screening apparatus of greater mesh—say .010 of an inch—and to subject the screenings of the coarser screens to the effect of screens of ultimate fineness. Thus the very fine screens, wherein the screening must be effected slowly and with care, will be subjected to only a part of the bulk of material, and the proportion of particles which will be permitted to pass through such screens will be relatively high. If, on the other hand, the entire bulk of the crushed material were passed over the extremely fine screens of ultimate mesh, an equally-effective screening operation would only be obtained by extending the screening-surfaces to a very much greater proportional extent. In other words, a better, cheaper, and more expeditious screening operation can be effected by first passing the crushed material over a screen of, say, .010 of an inch mesh and by then passing the screenings thereof over a screen of .003 of an inch mesh than would be obtained if the original crushed material were passed over two screens of .003 of an inch mesh.

When my improved apparatus is used for the purpose of rescreening, it may be employed in connection with any desired grinding or screening devices by which may be secured sufficiently fine particles as to be effectively acted upon by the very fine screens.

In order that my invention may be better understood, attention is directed to the accompanying drawings, forming part of this specification, and in which—

Figure 1 is a diagrammatic view of a screening or rescreening apparatus embodying my present improvements; and Figs. 2, 3, and 4, sectional views through screens of different thicknesses, illustrating the advantages of employing very thin screens for securing the best results.

In all of the above views corresponding parts are represented by the same numerals of reference.

For convenience of illustration it will be assumed that the apparatus is employed in the screening of Portland cement and that it is desirable to reduce it to particles of .003 of an inch in diameter and under.

1 1 1 represent the very fine screens, which are preferably extremely thin steel plates having screening-slots 2 therein, as shown in Fig. 2. These plates are relatively short, and checking-shelves 3 are illustrated between the plates to bring the material to rest before passing over each of the plates. In the assumed case the mesh of the screens 1 is .003 of an inch.

4 4 represent coarser screens placed below the fine screens and of the same character. The mesh of the screens 4 is intermediate of the larger of the fine particles and the smallest of the coarse particles, a constant load of which is to be maintained through the apparatus, as will be explained. It will be assumed that the fine particles which are fed to the screening apparatus from the crushing plant are .010 of an inch in size and less and that the coarse particles vary in size from .125 to .200. A convenient mesh for the screens 4 will be .050, or five times as large as the largest of the fine particles, which hence pass readily through the same, and less than half as small as the smallest of the coarse particles, which therefore cannot be influenced by such screens.

5 is an elevator, the boot 6 of which may be supplied with the fine material by a conveyer 7.

8 is a conveyer which conveys material from the top of the elevator 5 to a hopper 9, having a roller-feed placed above the upper fine screen.

10 is a conveyer which carries off the fine particles separated by the fine screens 1, and 11 is a conveyer which carries off the remainder of the fine particles separated by the coarser screens 4.

12 is an apron or chute which directs coarse material from the bottom of the coarse screens to the elevator 5, as shown.

Assuming the apparatus to be used in the screening of high-grade Portland cement, that crushed cement material having particles .010 of an inch and less in diameter is fed to the conveyer 7, that the screens 1 are of .003 mesh and the screens 4 of .050 mesh, the operation will be as follows: The elevator 5 and conveyer 8 are first started and a bulk of coarse material having particles, say, from .125 to .200 of an inch in diameter is introduced into the boot 6 of the elevator and passes continuously through the apparatus. These particles will not be affected by either the screens 1 or 4. The coarse particles may be cement material or a separate refractory material, such as quartz-sand, preferably the former. The fine cement material having particles .010 of an inch or less in diameter is now fed to the conveyer 7 in quantity preferably not more than one-third that of the bulk of coarse material in transit through the apparatus. The fine particles will be mixed with the coarse particles and be carried by the elevator 5 and conveyer 8 to the hopper 9, by which the mixture of coarse and fine particles will be fed to the uppermost screen 1 and by the roller-feed will be distributed in a thin wide stream on said screen. The particles will pass down the screen 1, and the sufficiently fine particles thereof having a diameter of .003 of an inch or less will be carried off by the conveyer 10. The rest of the fine particles, having a diameter between .003 and .010 of an inch, will pass through the screens 4 and be carried off by the conveyer 11 to be returned to any suitable crushing, grinding, or other reducing plant. The coarse particles will pass down the chute 12 and be again mixed with fine particles and carried up and through the apparatus, as explained. The presence of the coarse particles intermixed with the fine particles, and preferably in larger bulk, serves not only to prevent the fine particles from clotting or aggregating together and to keep the fine particles in agitation, so as to be effectively acted upon by the screens, but also the numerous fine points or projections carried by the coarser particles will engage in the screen-openings to remove therefrom any of the fine particles which may become wedged in such openings to otherwise clog the same. It will be seen from reference to Figs. 2, 3, and 4 that when the screen-plates are made very thin this cleaning effect will be much more perfect than if the plates are thicker. Thus, referring to Fig. 2, 13 may represent a coarse particle having a diameter of, say, .200 of an inch and provided with a projection 14, which may engage one of the openings 2 of the fine screen to effectively clean any foreign substances therefrom. If, however, as shown in Figs. 3 and 4, the screen-plates were made half again or twice as thick as that shown in Fig. 2, the projection 14 could not pass to the depth of the screen-opening, and hence would not clean an obstruction therefrom, and the proportion of projections which could pass to the entire depth of such openings would be extremely small. A further advantage of using very thin plates, and preferably those having a thickness less than the width of the screen-openings, is that there is less likelihood of particles becoming wedged therein than is the case with thicker plates, as appears from consideration of these figures, wherein 15 represents a particle which can readily pass through a perforation of a certain width in a thin plate, as shown in Fig. 2, but which would become wedged in a perforation of the same width in a thicker plate, as shown in Figs. 3 and 4.

I do not claim herein the methods involved in the use of the apparatus described, consisting in maintaining in circulation an approximately constant load of coarse particles, in adding to the circulating coarse particles the fine material to be screened or rescreened, in subjecting the fine and coarse particles to a screening operation whereby the sufficiently small fine particles will be withdrawn from the circulation, and in separating from the coarse particles the remaining fine particles not withdrawn from the circulation, since such methods are made the subject of my application for Letters Patent filed March 31, 1900, Serial No. 10,929.

Having now described my invention, what I claim as new, and desire to secure by Letters Patent, is as follows:

1. A screening apparatus comprising in combination a fine screen through which the fine particles desired may pass, a coarser screen to which the tailings of the fine screen are directed and through which the rest of the fine particles may pass, conveying devices for receiving at the bottom of the coarse screen a substantially uniform bulk of coarse particles too large to be affected by either screen and for directing the coarse particles to the top of the fine screen, means for adding to the coarse particles a smaller portion of fine material, and means for separately withdrawing the screenings of both screens, substantially as set forth.

2. An apparatus for screening fine material comprising in combination a thin screen-plate having screening-slots therein of the mesh necessary to separate the desired fine particles, such plate being less in thickness than the width of said slots, a screen of coarser mesh to which the tailings of the fine screen are directed and through which the rest of the fine particles may pass, means for directing over both screens a mixture of fine particles to the screen and a larger bulk of coarse material, the particles of which are not affected by either screen, and means for separately removing from the apparatus the particles passing through both screens, substantially as set forth.

This specification signed and witnessed this 23d day of February, 1900.

THOMAS A. EDISON.

Witnesses:
FRANK L. DYER,
J. F. RANDOLPH.